(12) United States Patent
You et al.

(10) Patent No.: US 11,713,845 B2
(45) Date of Patent: Aug. 1, 2023

(54) BASE FOR DISPLAY BRACKET AND DISPLAY BRACKET

(71) Applicant: NINGBO TUOTUO RIVER DESIGN COMPANY, Zhejiang (CN)

(72) Inventors: Xiaodong You, Zhejiang (CN); Hongjun Wang, Zhejiang (CN)

(73) Assignee: NINGBO TUOTUO RIVER DESIGN COMPANY, Zhejiang (CN)

( * ) Notice: Subject to any disclaimer, the term of this patent is extended or adjusted under 35 U.S.C. 154(b) by 0 days.

(21) Appl. No.: 17/402,655

(22) Filed: Aug. 16, 2021

(65) Prior Publication Data
US 2022/0290804 A1    Sep. 15, 2022

(30) Foreign Application Priority Data

Mar. 9, 2021 (CN) .......................... 202110254818.6

(51) Int. Cl.
  *F16B 2/02* (2006.01)
  *F16M 13/02* (2006.01)
  *F16M 11/22* (2006.01)
  *F16B 2/06* (2006.01)

(52) U.S. Cl.
  CPC ............ *F16M 13/02* (2013.01); *F16M 11/22* (2013.01); *F16B 2/02* (2013.01); *F16B 2/065* (2013.01); *F16M 2200/08* (2013.01)

(58) Field of Classification Search
  USPC ........ 248/154, 226.11, 227.2, 228.6, 231.71, 248/313, 316.1, 220.21, 220.22, 221.11, 248/222.11, 222.14
  See application file for complete search history.

(56) References Cited

U.S. PATENT DOCUMENTS

| 1,243,118 | A | * | 10/1917 | Trivigino | A01K 15/00 24/135 N |
| 4,569,510 | A | * | 2/1986 | Haramoto | B25B 1/125 269/181 |
| 5,720,096 | A | * | 2/1998 | Dorsey | B23D 47/04 83/458 |
| 5,941,152 | A | * | 8/1999 | Kim | B25B 5/10 29/283 |
| 6,010,121 | A | * | 1/2000 | Lee | B25B 5/08 269/215 |
| 6,092,797 | A | * | 7/2000 | You | B25B 1/2484 269/900 |

* cited by examiner

*Primary Examiner* — Alfred J Wujciak
(74) *Attorney, Agent, or Firm* — Yu Gang

(57) ABSTRACT

Some embodiments of the disclosure provide a base for a display bracket and the display bracket, wherein the base for the display bracket includes a supporting part, a connecting part, and a lock screw. The connecting part is connected with the supporting part. The connecting part is provided with a first through hole and a movable block movably disposed at the first through hole. The lock screw passes through the first through hole, a clamping space is formed between a free end of the lock screw and the supporting part. The movable block has a thread engaged with the lock screw, so that when the thread of the movable block is controlled to be disengaged from the lock screw, the lock screw does not need to be turned and freely rises or falls in the first through hole of the connecting part.

8 Claims, 8 Drawing Sheets

BASE FOR DISPLAY BRACKET AND DISPLAY BRACKET

CROSS-REFERENCE TO RELATED APPLICATIONS

This application claims priority to Chinese Patent Application No. 202110254818.6, filed on Mar. 9, 2021, and entitled "Base for Display Bracket".

TECHNICAL FIELD

The disclosure relates to a technical field of display brackets, in particular to a base for a display bracket and the display bracket.

BACKGROUND

With a continuous development of society, flat-panel displays, tablet computers and the like have become more and more widespread, and their matching brackets have emerged, such as desktop display brackets. A structure of a desktop display bracket generally includes a clamping mechanism connected with a desktop or a table top, a rotating arm, and a plate supporting the display.

In a art known to inventors, the clamping mechanism, connected with the display bracket and desktop or the table top, generally includes an L-shaped supporting part, a connecting part, and a lock screw. The connecting part is connected with connecting holes on the supporting part through screws, the lock screw is screwed onto the connecting part, and a gap for accommodating the desktop or the table top is reserved between a free end of the lock screw and a top end of the supporting part.

During mounting, by turning the lock screw, the free end of the lock screw clamps the desk or the table top more firmly. Since the lock screw and the connecting part are in threaded connection, it is often necessary to turn dozens of rounds to achieve locking. If the lock screw is not long enough, it is necessary to remove the connecting part, adjust a gap between the connection part and the supporting part, and then lock by turning round and round. Therefore, the existing mounting operation is more troublesome, as the clamping mechanism cannot quickly clamp the desk or the table top, which leads to the low efficiency of installation.

SUMMARY

In view of the above technical problems, some embodiments of the disclosure provide a base for a display bracket that can be mounted quickly and greatly improve mounting efficiency.

In order to achieve the above objective, the technical solutions of the base for the display bracket provided by the disclosure are as follows.

The base for the display bracket includes a supporting part, a connecting part, and a lock screw. The connecting part is connected with the supporting part; the connecting part is provided with a first through hole and a movable block movably disposed at the first through hole; the lock screw passes through the first through hole, a clamping space is formed between a free end of the lock screw and the supporting part; the movable block has a thread engaged with the lock screw, so that when the thread of the movable block is controlled to be disengaged from the lock screw, the lock screw does not need to be turned and can freely rise or fall in the first through hole of the connecting part, and when the movable block is controlled to be engaged with the lock screw, the lock screw is turned to rise or fall in the through hole of the connecting part.

In some embodiments, for the purpose of achieving engagement and disengagement between the thread of the movable block and the lock screw, the movable block is disposed on the connecting part through a rotating shaft to ensure the thread of the movable block is rotatable and repositioned around the rotating shaft.

In some embodiments, a first matching hole is formed in a middle of the movable block; the thread is disposed on a side face of an upper portion of the movable block; a spring piece is disposed between the connecting part and the lower portion of the movable block; the connecting part is provided with a second matching hole cooperated with the first matching hole; the rotating shaft passes through the first matching hole and the second matching hole, so that when a top of the movable block is pressed, the movable block can rotate around the rotating shaft to achieve disengagement between the thread of the movable block and the lock screw, and when the top of the movable block is released, the movable block is automatically reset around the rotating shaft to achieve engagement between the thread of the movable block and the lock screw.

In some embodiments, the movable block is configured to horizontally move in a resettable manner relative to the connecting part, thereby achieving engagement and disengagement between the thread of the movable block and the lock screw.

In some embodiments, the movable block is provided with a second through hole; a spring piece is disposed between the movable block and the connecting part; the second through hole is provided with a threaded area on one side of the second through hole and a free area on the other side of the second through hole; the lock screw is configured to pass through the first through hole and the second through hole, so that when the movable block is pulled to horizontally move, the thread of the movable block is disengaged from the lock screw, and the lock screw is located in the free area of the second through hole, and when the movable block is released, the movable block is automatically reset, and the lock screw is located in the threaded area of the second through hole, achieving engagement between the thread of the movable block and the lock screw.

Some embodiments of the present disclosure provide a display bracket, wherein the display bracket includes the above base for the display bracket and a plate supporting the display.

According to the base for the display bracket of the disclosure, the lock screw does not need to be turned round and round, a height of the lock screw can be directly quickly adjusted to reach a desktop or a table top, then the lock screw can be mounted in place by turning, and thus the mounting efficiency is greatly improved.

DETAILED DESCRIPTION OF THE EMBODIMENTS

In order to describe the technical content of the disclosure more clearly, the following are further descriptions in combination with the specific embodiments.

Figure 1:
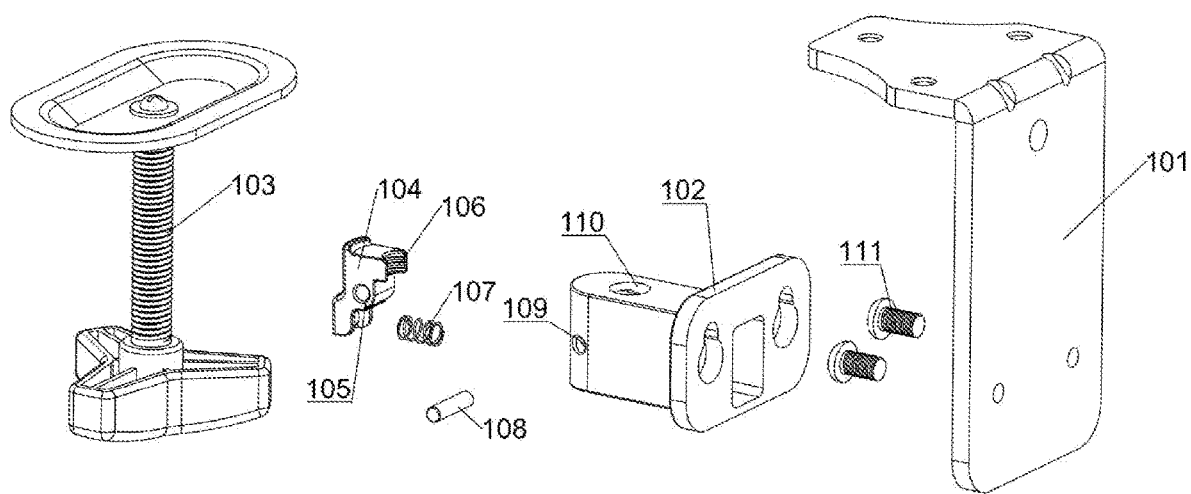
FIG. 1 illustrates an exploded view of a base for a display bracket according to a first embodiment of the disclosure.
Figure 2:
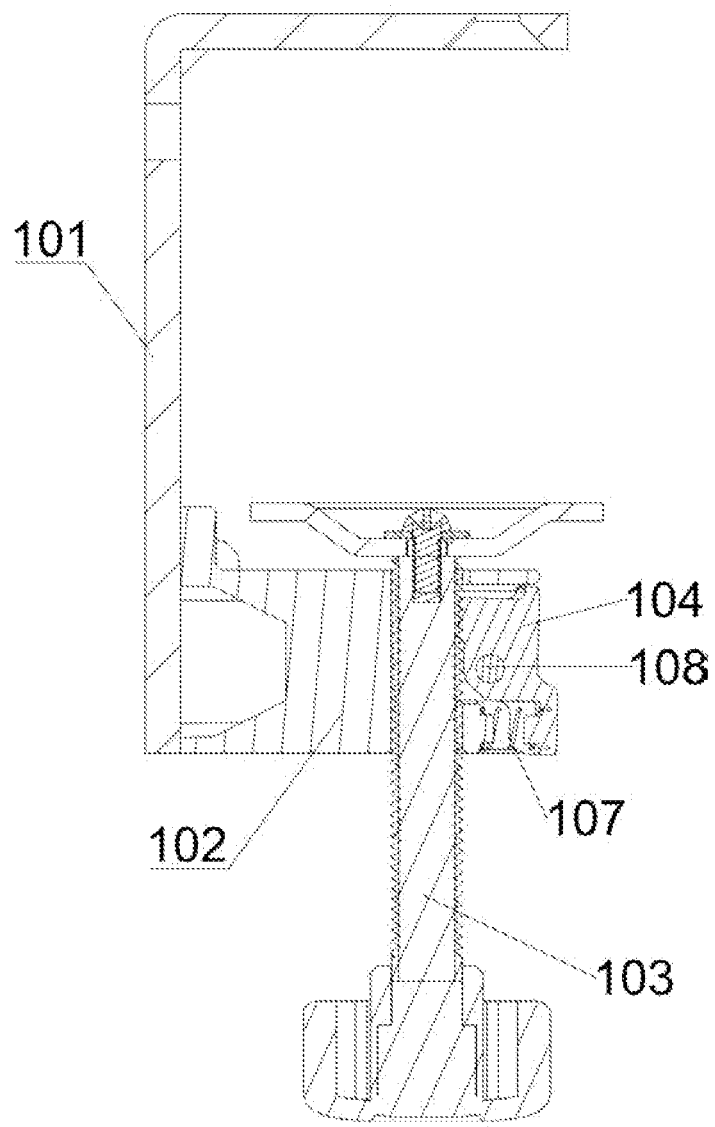
FIG. 2 illustrates a schematic diagram showing a first state of the base for the display bracket according to the first embodiment of the disclosure.
Figure 3:
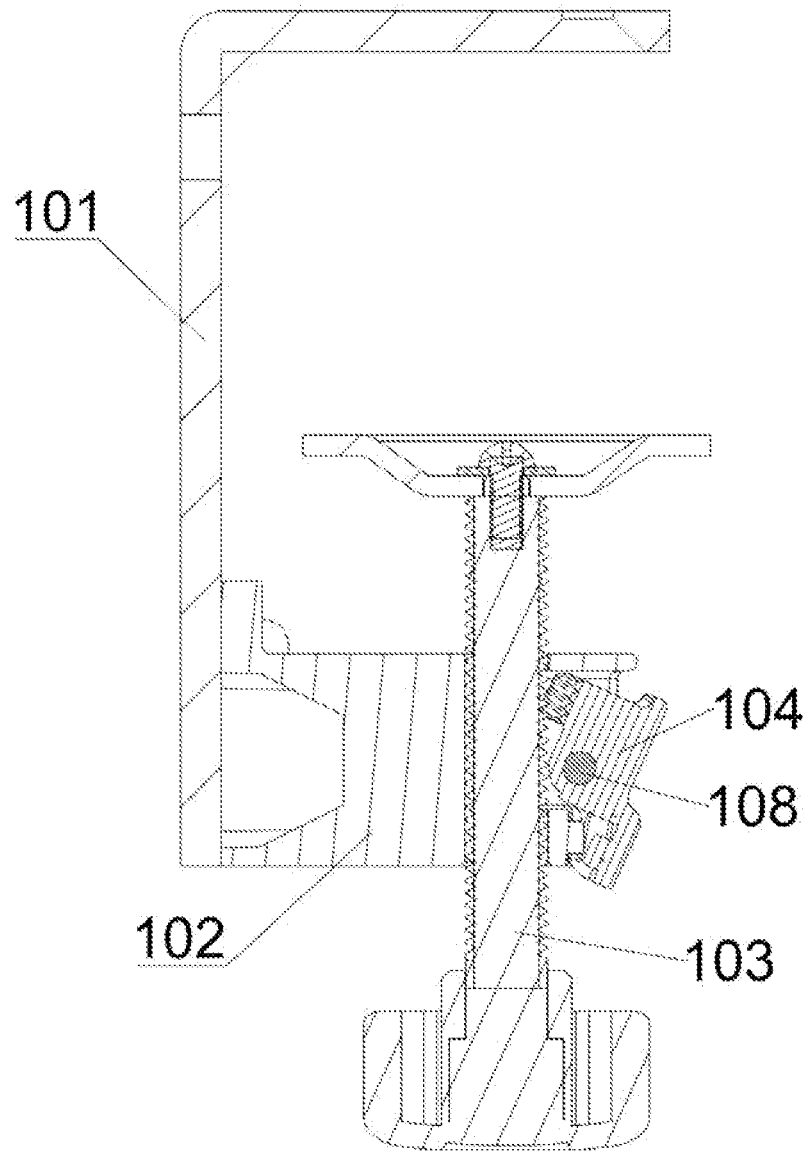
FIG. 3 illustrates a schematic diagram showing a second state of the base for the display bracket according to the first embodiment of the disclosure.

As shown in FIG. 1 to FIG. 3, provided is a base for a display bracket according to a first embodiment of the disclosure. The base for the display bracket includes a supporting part 101, a connecting part 102, and a lock screw 103. The supporting part 101 is L-shaped and includes a top plate and a side plate. The top plate of the supporting part 101 can be used for mounting other parts of the display bracket, and the side plate of the supporting plate 101 is fixedly connected with the connecting part 102 through bolts 111. The connecting part 102 has a first through hole 110. The lock screw 103 is provided with a thread, and passes through the first through hole 110. An upper locking plate of the lock screw 103 is a free end. After the lock screw 103 passes through the first through hole 110, the free end of the lock screw 103 and the top plate of the supporting plate 101 form a clamping space for clamping a desktop or a table top.

In the technical solution provided by the disclosure, the connecting part 102 is further provided with a movable block 104 movably disposed at the first through hole 110. The movable block 104 has a thread 106 engaged with the lock screw 103. The thread of the movable block 104 is controlled to be disengaged from or engaged with the lock screw 103. As shown in FIG. 3, when the thread of the movable block 104 is disengaged from the lock screw, the lock screw 103 does not need to be turned and freely rises or falls in the first through hole 110 of the connecting part. As shown in FIG. 2, when the movable block 104 is engaged with the lock screw, the lock screw needs to be turned to rise or fall in the through hole of the connecting part so as to achieve locking.

In some embodiments, the thread is disposed on a side face of an upper portion of the movable block; a spring piece is disposed between the connecting part and a lower portion of the movable block; when the movable block is pressed, the movable block rotatably moves around the rotating shaft to achieve disengagement between the thread of the movable block and the lock screw, and when the movable block is released, the movable block is automatically reset around the rotating shaft to achieve engagement between the thread of the movable block and the lock screw.

In the first embodiment, the movable block 104 is controlled by pressing to turn, so as to be engaged with or disengaged from the lock screw 103. Specifically, the movable block 104 is disposed on the connecting part 102 through a rotating shaft 108, and a first matching hole 105 is formed in a middle of the movable block 104; the thread 106 is disposed on a side face of the upper portion of the movable block 104; a spring piece 107 is disposed between the lower portion of the movable block 104 and the connecting part 102; the connecting part 102 is provided with a second matching hole 109 cooperated with the first matching hole 105; the rotating shaft 108 passes the first matching hole 105 and the second matching hole 109, so that the thread 106 of the movable block 104 rotates around the rotating shaft 108, and is able to be repositioned, so that the thread of the movable block and the lock screw can be engaged or disengaged.

During mounting, by pressing the top of the movable block 104, the movable block 104 rotatably moves around the rotating shaft to achieve disengagement between the thread of the movable block and the lock screw, and the lock screw is freely adjusted up and down in the connecting part until reaching a target position. By releasing the top of the movable block 104, under action of the spring piece, the movable block 104 is automatically reset around the rotating shaft 108 to achieve engagement between the thread of the movable block and the lock screw. At last, by turning the lock screw, locking is further strengthened, thereby completing the mounting. Thus, the lock screw does not need to be turned round and round, the position of the lock screw is quickly adjusted, and mounting efficiency of a clamping mechanism of the display bracket is greatly improved.

Figure 4:
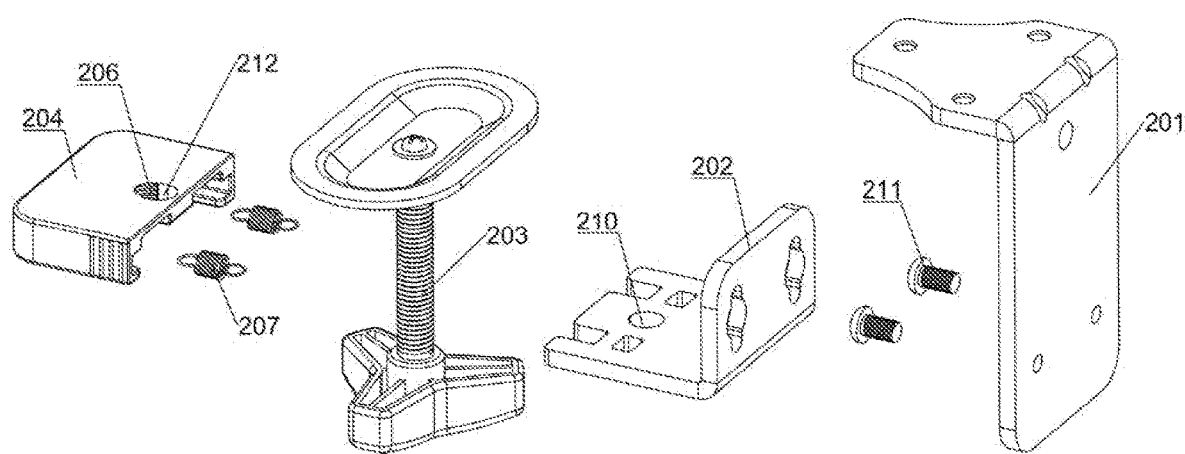
FIG. 4 illustrates an exploded view of a base for the display bracket according to a second embodiment of the disclosure.
Figure 5:
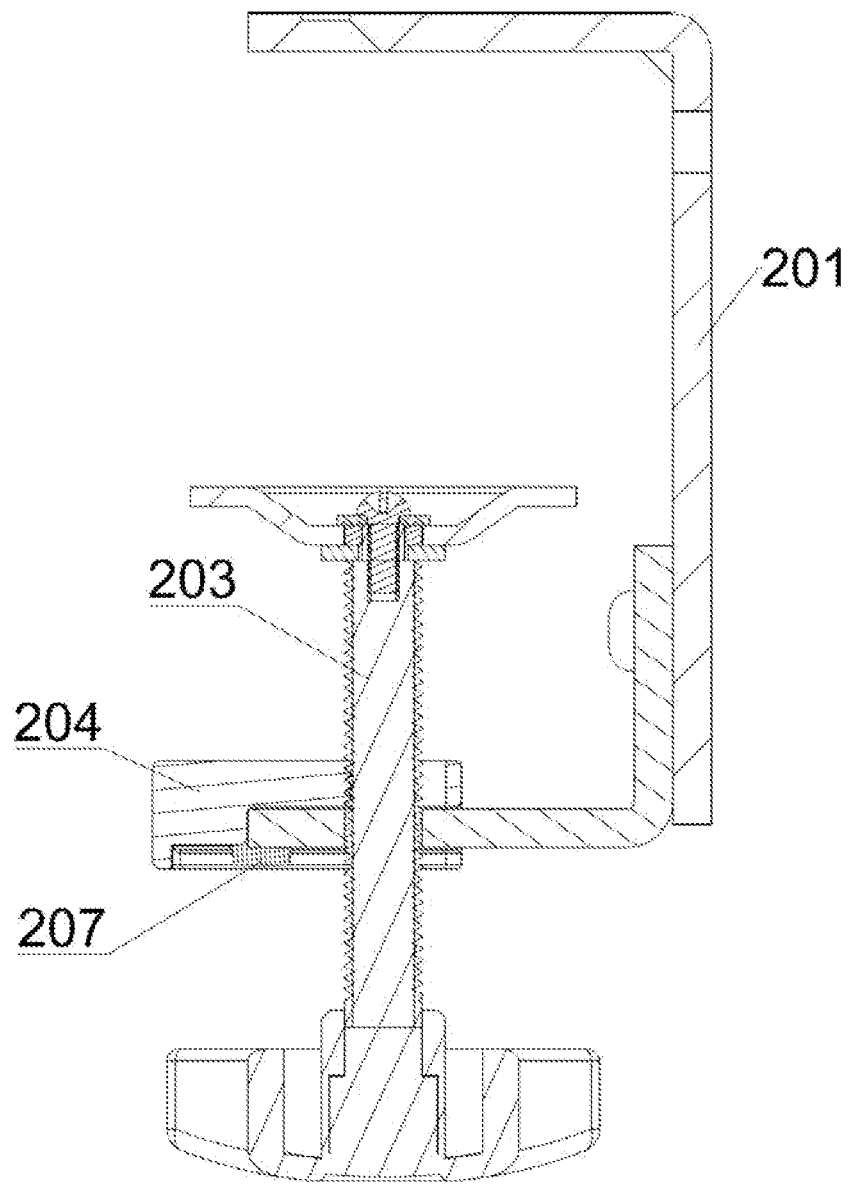
FIG. 5 illustrates a schematic diagram showing a first state of the base for the display bracket according to the second embodiment of the disclosure.
Figure 6:
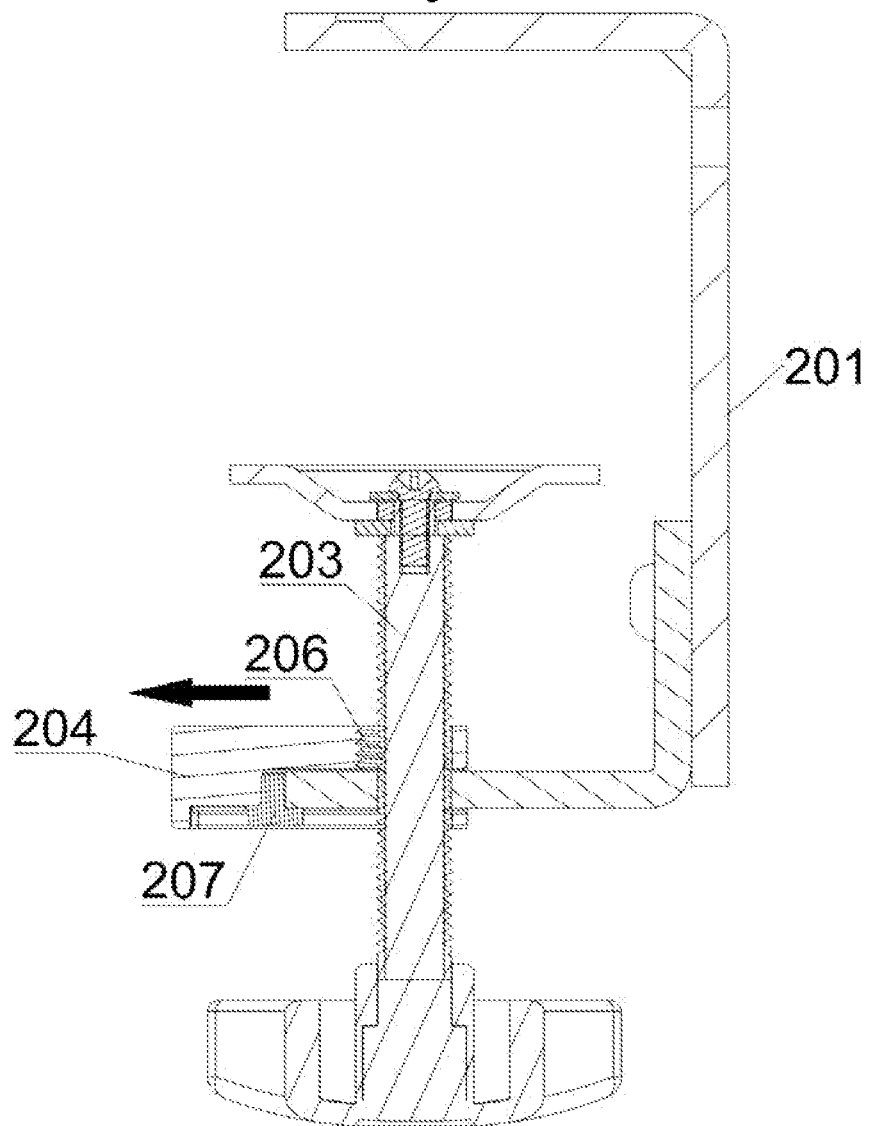
FIG. 6 illustrates a schematic diagram showing a second state of the base for the display bracket according to the second embodiment of the disclosure.
Figure 7:
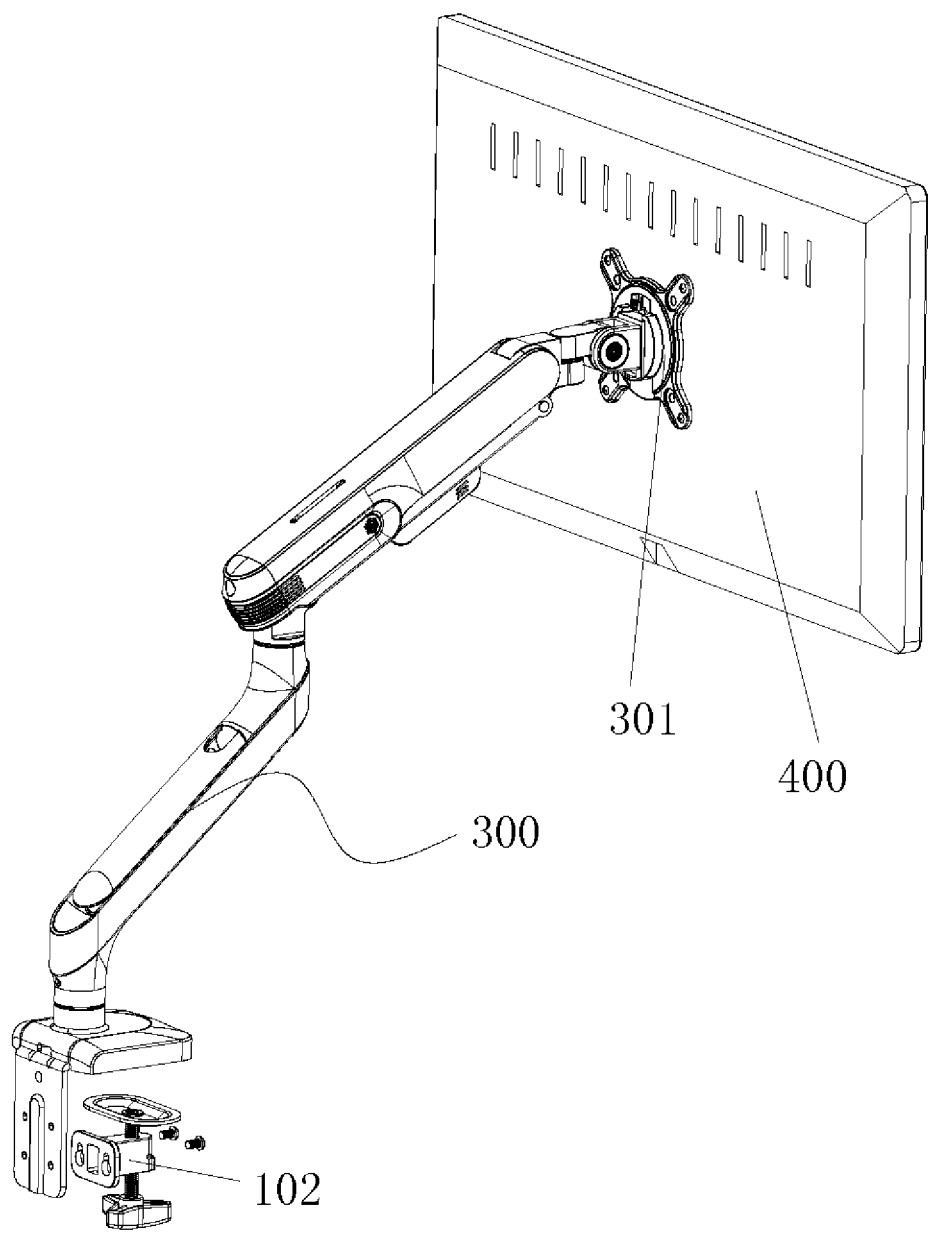
FIG. 7 illustrates an exploded view of a display bracket according to the some embodiments of the disclosure.
Figure 8:
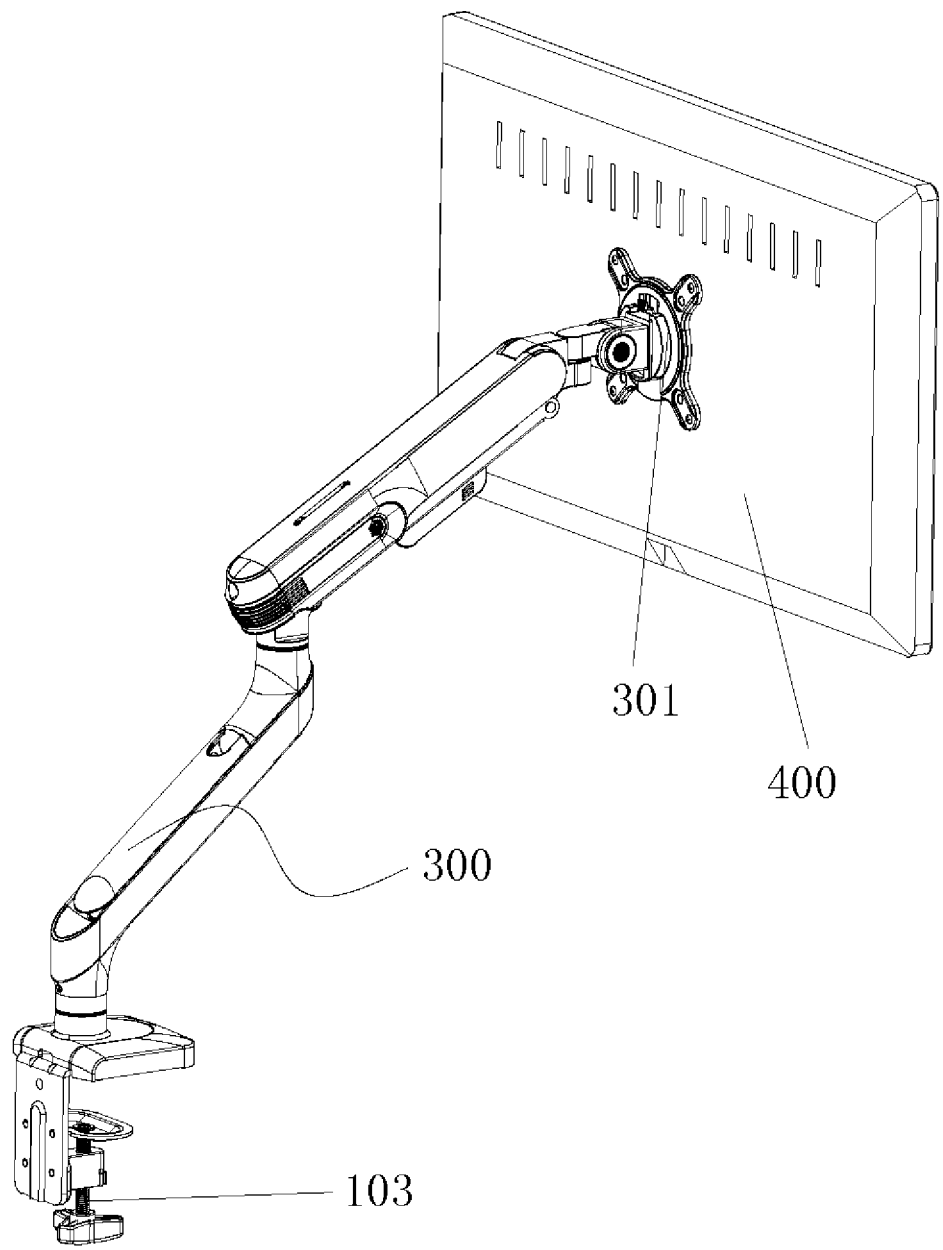
FIG. 8 illustrates a structural diagram of the display bracket according to the some embodiments of the disclosure.

As shown in FIG. 4 to FIG. 6, provided is a base for the display bracket according to a second embodiment of the disclosure. The base for the display bracket includes a supporting part 201, a connecting part 202, and a lock screw 203. The supporting part 201 is L-shaped and included a top plate and a side plate. The top plate of the supporting part 201 is used for mounting other parts of the display bracket, and the side plate of the supporting plate 201 is fixedly connected with the connecting part 202 through bolts 211. The connecting part 202 has a first through hole 210. The lock screw 203 is provided with a thread, and passes through the first through hole 210. An upper locking plate of the lock screw 203 is a free end. After the lock screw 203 passes through the first through hole 210, the free end of the lock screw 203 and the top plate of the supporting plate 201 form a clamping space for clamping the desktop or the table top.

In the technical solution provided by the disclosure, the connecting part 202 is further provided with a movable block 204 movably disposed at the first through hole 210. The movable block 204 has a thread 206 engaged with the lock screw 203. The thread of the movable block 204 is controlled to be disengaged from or engaged with the lock screw 203. When the thread of the movable block 204 is disengaged from the lock screw, the lock screw 203 does not need to be turned and freely rises or falls in the first through hole 210 of the connecting part. When the movable block 204 is engaged with the lock screw, the lock screw needs to be turned to rise or fall in the through hole of the connecting part so as to achieve locking.

In the second embodiment, the movable block 204 is controlled by pulling to move, so as to be engaged with or disengaged from the lock screw 203. In some embodiments, the movable block 204 is configured to horizontally move in a resettable manner relative to the connecting part 202, thereby achieving engagement and disengagement between the thread 206 of the movable block 204 and the lock screw 203.

The movable block 204 is provided with a second through hole 212; a spring pieces 207 is disposed between the movable block 204 and the connecting part 202; the second through hole 212 is provided with a threaded area on one side of the second through hole 212 and a free area on the other side of the second through hole 212. The thread 206 is disposed in the threaded area. The lock screw passes through the first through hole and the second through hole. As shown in FIG. 5, when in the threaded area, the lock screw 203 is engaged with the movable block 204. As shown in FIG. 6, when in the free area, the lock screw 203 is freely passed through the first through hole 210 and the second through hole 212.

In some embodiments, a number of the spring piece is two, two spring pieces are parallel disposed.

During mounting, the movable block 204 is pulled backwards to horizontally move, the thread 206 of the movable block 204 is disengaged from the lock screw 203, the lock screw 203 is located in the free area of the second through hole 212, and the lock screw 203 is freely adjusted up and down in the connecting part until reaching a target position. By releasing the movable block 204, under action of the spring pieces, the movable block 204 is automatically reset, the lock screw 203 is located in the threaded area of the second through hole 212, so that engagement between the thread of the movable block and the lock screw is achieved. At last, by turning the lock screw, locking is further strengthened, thereby completing the mounting. Thus, the lock screw does not need to be turned round and round, the position of the lock screw is quickly adjusted, and mounting efficiency of a clamping mechanism of the display bracket is greatly improved.

According to the base for the display bracket of the disclosure, the lock screw does not need to be turned round and round, a height of the lock screw is directly quickly adjusted to reach the desktop or the table top, then the lock screw is mounted in place by turning, and thus the mounting efficiency is greatly improved.

Some embodiments of the present disclosure provide a display bracket 300, wherein the display bracket 300 includes the above base for the display bracket and a plate supporting the display. The display bracket 300 also includes a hanging board 301 for carrying a display 400.

In the description, the disclosure has been described with reference to its specific embodiments. However, various modifications and variations can still be made without departing from the spirit and scope of the disclosure. Therefore, the description is considered to be illustrative rather than limited.

What is claimed is:

1. A display bracket for supporting a display, comprising
a supporting part for supporting the display
a connecting part for mounting on a base; and
a lock screw, wherein the connecting part is connected with the supporting part; the connecting part is provided with a first through hole and a movable block movably disposed at the first through hole; the lock screw passes through the first through hole, a clamping space is formed between a free end of the lock screw and the supporting part; the movable block has a thread engaged with the lock screw, so that when the thread of the movable block is controlled to be disengaged from the lock screw, the lock screw does not need to be turned and freely rises or falls in the first through hole of the connecting part, and when the movable block is controlled to be engaged with the lock screw, the lock screw is turned to rise or fall in the through hole of the connecting part;
wherein the movable block is disposed on the connecting part through a rotating shaft to ensure the thread of the movable block is rotatable and repositioned around the rotating shaft, so that the thread of the movable block and the lock screw is engaged or disengaged;
wherein the thread is disposed on a side face of an upper portion of the movable block; a spring piece is disposed between the connecting part and a lower portion of the movable block; when the movable block is pressed, the movable block rotatably moves around the rotating shaft to achieve disengagement between the thread of the movable block and the lock screw, and when the movable block is released, the movable block is automatically reset around the rotating shaft to achieve engagement between the thread of the movable block and the lock screw.

2. The base for the display bracket according to claim 1, wherein a first matching hole is formed in a middle of the movable block; the thread is disposed on a side face of an upper portion of the movable block; a spring piece is disposed between the connecting part and a lower portion of the movable block; the connecting part is provided with a second matching hole cooperated with the first matching hole; the rotating shaft passes through the first matching hole and the second matching hole, so that when a top of the movable block is pressed, the movable block rotatably moves around the rotating shaft to achieve disengagement between the thread of the movable block and the lock screw, and when the top of the movable block is released, the movable block is automatically reset around the rotating shaft, to achieve engagement between the thread of the movable block and the lock screw.

3. The base for the display bracket according to claim 1, wherein the movable block is configured to horizontally move in a resettable manner relative to the connecting part, thereby achieving engagement and disengagement between the thread of the movable block and the lock screw.

4. The base for the display bracket according to claim 3, wherein the movable block is provided with a second through hole; a spring piece is disposed between the movable block and the connecting part; the second through hole is provided with a threaded area on one side of the second through hole and a free area on the other side of the second through hole; the lock screw is configured to pass through the first through hole and the second through hole, so that when the movable block is pulled to horizontally move, the thread of the movable block is disengaged from the lock screw, and the lock screw is located in the free area of the second through hole, and when the movable block is released, the movable block is automatically reset, and the lock screw is located in the threaded area of the second through hole, achieving engagement between the thread of the movable block and the lock screw.

5. The base for the display bracket according to claim 4, wherein a number of the spring piece is two, two spring pieces are parallel disposed.

6. The base for the display bracket according to claim 1, wherein the supporting part is L-shaped and comprises a top plate and a side plate, the top plate of the supporting part is used for mounting other parts of the display bracket, and the side plate of the supporting plate is fixedly connected with the connecting part through bolts.

7. The base for the display bracket according to claim 6, wherein the free end of the lock screw and the top plate of the supporting plate form the clamping space for clamping a desktop or a table top.

8. A display bracket, wherein the display bracket comprises the base for the display bracket as claimed in the claim 1 and a hanging board for carrying a display.

* * * * *